United States Patent [19]

Sugimura

[11] Patent Number: 4,958,973
[45] Date of Patent: Sep. 25, 1990

[54] INTERNAL-PRESSURE-BEARING FEMALE SCREW

[76] Inventor: Nobuyuki Sugimura, 308, Mabase, Shimizu-shi, Shizuoka-ken, Japan

[21] Appl. No.: 204,196

[22] Filed: Jun. 9, 1988

[30] Foreign Application Priority Data

Mar. 23, 1988 [JP] Japan .................................. 63-68669

[51] Int. Cl.⁵ ......................... F16B 35/04; F16L 25/00
[52] U.S. Cl. .................................... 411/423; 411/436; 285/333; 220/3
[58] Field of Search ............... 411/411, 414, 426, 423, 411/436, 263, 307–311; 285/333, 334; 220/3

[56] References Cited

U.S. PATENT DOCUMENTS

| | | | |
|---|---|---|---|
| 2,641,488 | 6/1953 | Dunn et al. | 285/333 |
| 2,772,102 | 11/1956 | Webb | 411/414 X |
| 3,083,043 | 3/1963 | Thornhill | 285/333 |
| 3,210,096 | 10/1965 | Van Der Wissel | 285/334 X |
| 3,266,363 | 8/1966 | Bronson et al. | 411/436 |
| 3,664,540 | 5/1972 | Witkin | 220/3 X |
| 4,189,975 | 2/1980 | Nisida et al. | 411/423 |
| 4,549,754 | 10/1985 | Saunders et al. | 411/411 X |

FOREIGN PATENT DOCUMENTS

| | | | |
|---|---|---|---|
| 843952 | 7/1952 | Fed. Rep. of Germany | 411/411 |
| 106754 | 8/1979 | Japan | 411/436 |
| 786652 | 11/1957 | United Kingdom | 285/333 |

Primary Examiner—Neill R. Wilson

[57] ABSTRACT

An internal-pressure-bearing female screw adapted to be applied with a varying composite load due to variation of an internal pressure, in which the thread contact heights of the female screw are formed so as to be successively lowered along the direction of an applied tensile load, whereby the bending moments per unit length at the bottom of valleys of the respective female screw threads are equalized to reduce the maximum bending moment and the bending moment amplitude.

5 Claims, 6 Drawing Sheets

INTERNAL-PRESSURE-BEARING FEMALE SCREW

BACKGROUND OF THE INVENTION

The present invention relates to an internal-pressure-bearing female screw for use at a location where load variation is great, for instance, in a hydraulic instrument such as an accumulator or a hydraulic cylinder, and more particularly to an internal-pressure-bearing female screw having an excellent fatigue characteristic.

For instance, in an accumulator operating as a hydraulic instrument, an interior of a vessel main body is partitioned by a bladder into a gas chamber and a liquid chamber, the both end portions of the vessel are closed by side plates, also the bladder is allowed to expand and contract in response to hydraulic pressure variation in a hydraulic circuit to make the accumulator perform a pulsation absorbing action and a shock absorber action, and as means for fixing this vessel main body with the side plate, a parallel screw is employed.

Now, if the pressure within the accumulator rises and the side plates are pushed outwards, then to the screw are applied loads in the axial direction and in the circumferential direction, that is, the so-called variable composite load, and this load is not uniformly borne by the respective screw threads but it is greatly deviated in the direction of a tensile force.

Consequently, concentration of stress would occur at the bottom of a valley in the tip end portion of a female screw that is subjected to a large tensile load, and so, the female screw would be ruptured at that position.

Therefore, in order to resolve this problem, it can be conceived to utilize "Screwed Connection Having Excellent Fatigue Characteristics Making Use Of Tapered Male Screw" (See U.S. Pat. No. 4189975 and Japanese Patent Publication No. 56-53651 (1981)) [The title of the U.S. patent is "Screwed Connection Having Improved Fatique Strength."].

The inventor of this invention manufactured a testing accumulator in which a female screw 2 of a vessel main body 1 and a male screw 4 of a side plate 3 are formed of 60-degree triangular screw threads M106.8×2 and the thread heights h of the screw threads $m_7$ - $m_1$ of this male screw 4 are successively reduced as shown in FIG. 6, also manufactured an accumulator of the prior art type in which the above-described triangular screw threads are used under a standard condition, and load sharing proportions and fatigue lives of the respective screw threads in the respective accumulators were investigated under the condition of a seal diameter d=104 mm, an internal pressure p=0−318 kg/cm² and a frequency of 2.5 Hz.

According to the results of investigation, the load sharing proportions were made more even in the case of the testing accumulator than in the case of the accumulator of the prior art type, but the fatigue lives were shorter in the case of the testing accumulator than in the case of the accumulator of the prior art type.

In this connection, a screw thread having the largest load sharing proportion was the second screw thread $m_2$ counting from the tip end portion 2m and the proportion was 18.5% in the case of the testing accumulator, while in the case of the accumulator of the prior art type such screw thread was the first screw thread counting from the tip end portion and the proportion was 21%, and further, a fatigue life was 560,000 times in the case of the accumulator of the prior art type, while it was 380,000 times in the case of the testing accumulator.

Though it is a common practice that if a load sharing proportion of a screw thread is lowered, a fatigue life of a screw would be extended, in the case of the above-described testing accumulator, on the contrary, the fatigue life was shortened.

Hence, the cause was investigated and it was proved that among the maximum bending moments acting upon the bottoms f of valleys of female screw threads, a peak bending moment is applied to the second bottom $f_2$ of valley at the tip end portion 2e of the female screw, resulting in the largest amplitude of a bending moment, and failure would arise starting from that location.

In other words, when the female screw 2 is pushed by the male screw 4, the respective screw threads fm of the female screw take the state of a cantilever having a shared load applied onto its lower surface, and so, the thread height fh of the female screw thread fm can be deemed as a span which influences a magnitude of a bending moment.

Therefore, in the case where the thread heights fh are uniform, if the shared loads of the respective screw threads are not made uniform, then the larger the shared load is, the larger becomes the peak bending moment, hence a bending moment amplitude accompanying load variation would become large, and the screw thread becomes liable to be ruptured.

So, when bending moments per unit length arising at the bottoms of valleys of a female screw in the accumulator of the prior art type and the testing accumulator were calculated on the basis of a load, a load sharing proportion and a screw thread contact height, and the results of calculation were as shown in FIG. 3. In this figure, curve A represents the data of the accumulator of the prior art type, while curve B represents the data of the testing accumulator, and from these data it has been proved that a peak bending moment per unit length PB of 13.5 kg mm/mm arises at the bottom of the second female screw thread valley $f_2$ counting from the tip end portion 2 in the testing accumulator B, furthermore this moment PB is larger than the peak bending moment per unit length PA of 11.4 kg mm/mm in the accumulator of the prior art type A, and consequently, a bending moment amplitude becomes so large that the female screw is liable to be subjected to fatigue failure.

Hence, in order to prevent fatigue failure, it may be conceived to thickne the wall of the female screw or to elongate the screwed length. However, if these countermeasures are employed in a female screw of an accumulator, the vessel main body would become large-sized and becomes unable to be used at a location of small space, and moreover, materials would become wasteful.

SUMMARY OF THE INVENTION

In view of the above-mentioned circumstances, the present invention has it as an object to improve fatigue characteristics of a female screw, and also to provide a female screw which can be used even at a location of small space.

The present invention resides in that in a female screw subjected to a varying composite load due to variation of an internal pressure, contact heights of screw threads of the female screw are successively reduced along the direction of the tensile load applied thereto and thereby the maximum bending moments and the bending moment amplitudes applied to the respective female screw threads are made small.

DESCRIPTION OF THE PREFERRED EMBODIMENTS

Figure 1:
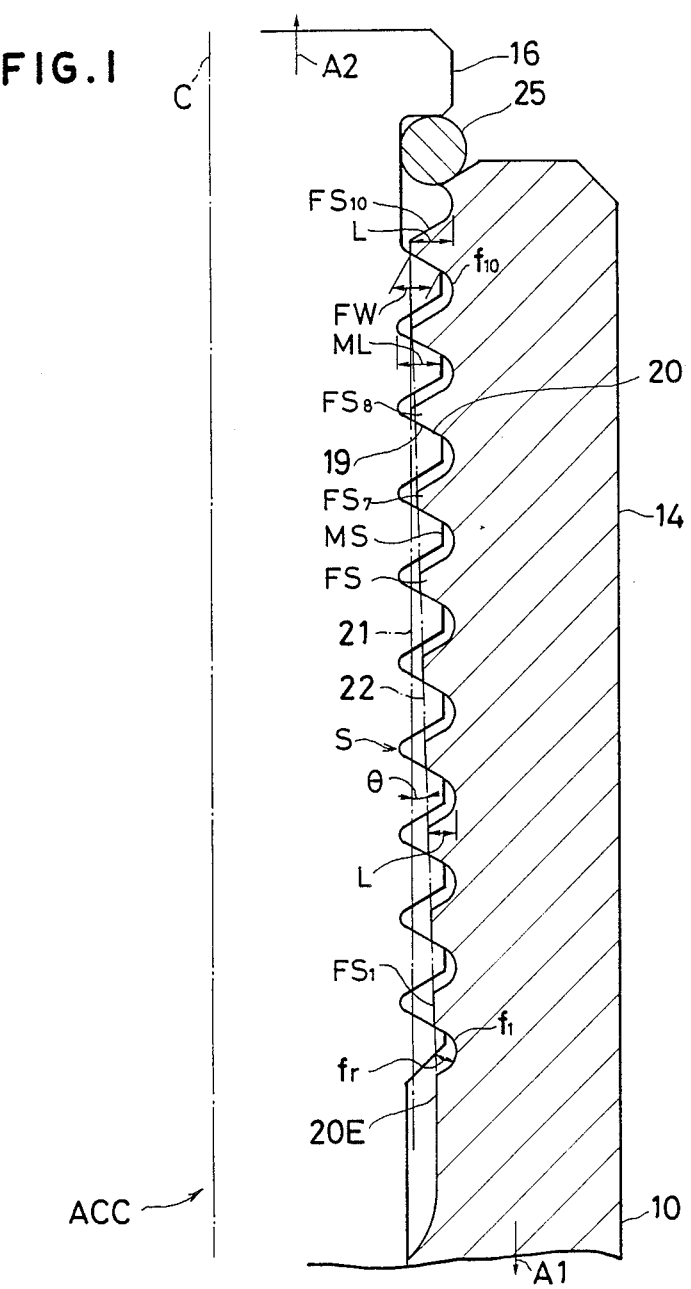
FIG. 1 is an enlarged longitudinal cross-section view showing one preferred embodiment of the present invention.

The preferred embodiments of the present invention will be described with reference to the accompanying drawings, in which component parts designated by like reference numerals have the same names and the same functions.

Figure 2:
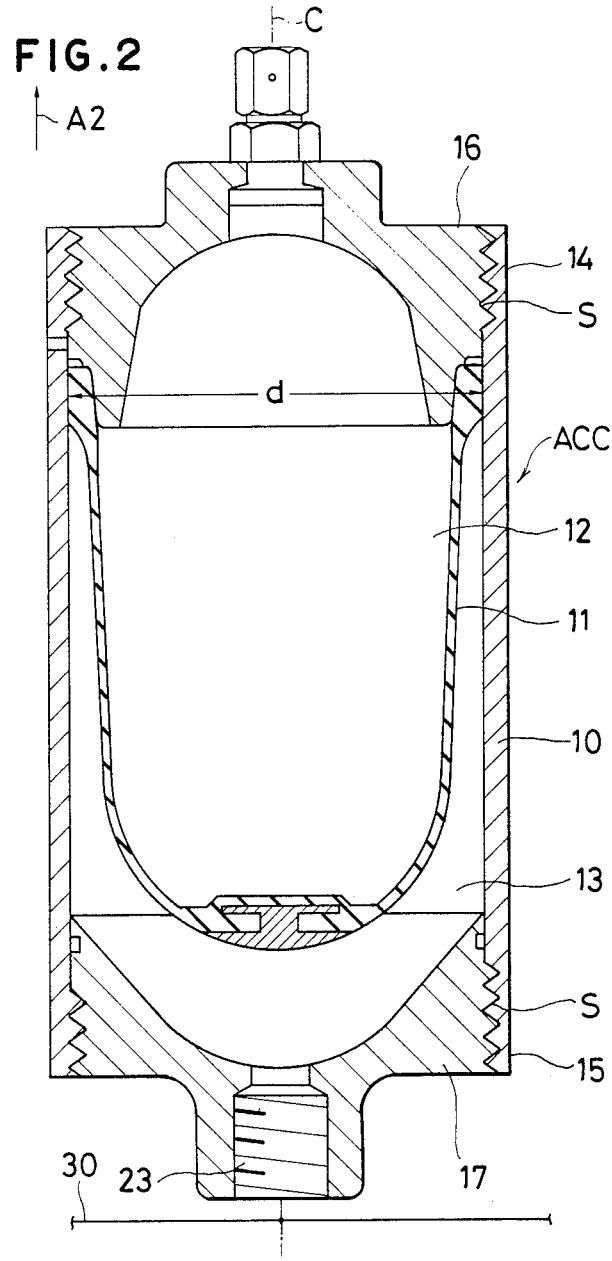
FIG. 2 is a longitudinal cross-section view of an accumulator embodying the present invention, whose male and female screw thread portions are shown in FIG. 1 in an enlarged scale.

FIG. 2 is a longitudinal cross-section view of an accumulator ACC, in which the interior of a vessel main body 10 is partitioned by a bladder 11 into a gas chamer 12 and a liquid chamber 13, and the opposite end portions 14 and 15 of this main body 10 are closed by side plates 16 and 17. These opposite end portions 14 and 15 of the main body 10 are threadedly secured to the side plates 16 and 17, and the threaded portions S therebetween are formed as shown in FIG. 1.

More particularly, on the inside of the end portion 14 of the vessel main body 10 is formed a female screw 20 to be mated with a male screw 19 of the side plate 16.

This female screw 20 is provided with 10 female screw threads FS, and with regard to the heights L of the respective screw threads, the female screw threads are formed to have an identical height from a female screw thread FS10 to a female screw thread FS8 so that the height of the female screw thread FS coming into contact with a male screw thread MS, that is, the so-called contact height FW may be equalized, but from a female screw thread FS7 to a female screw thread FS1, the crests of the female screw threads are cut and shaped to successively lower the heights L and to successively reduce the contact heights FW of the female screw threads along the direction of the applied tensile load, that is, along the direction indicated by arrow A1.

At this time, though a straight line 21 connecting the crest of the female screw thread FS10 and the crest of the female screw thread FS8 is parallel to a center line C of the female screw, a tapered straight line 22 connecting the crest of [he female screw thread FS8 and the crest of the female crew thread FS1 is inclined with respect to the straight line 21 by a taper angle $\theta$.

This taper angle $\theta$ can be appropriately selected in accordance with necessity, preferably the taper angle should be selected to be 10 degrees or less, and for instance, a taper angle $\theta = 3$ degrees is chosen.

The bottoms of valleys of the female screw f1–f10 are formed in an arcuate shape and the radius fr of the arc is 0.1–0.18 times as large as the pitch of the screw.

The respective heights ML of the threads of the male screw 19 are formed in a standard height. It is to be noted that reference numeral 25 designates a C-type stopper for preventing screwing to more than necessary extent.

Now description will be made on the operation of the illustrated embodiment, in which component parts designated by like reference numerals in the drawings have the same names and the same functions.

When the hydraulic pressure in the hydraulic circuit 30 varies and liquid is pushed into the accumulator ACC, the bladder 11 is compressed, hence the pressure in the air chamber 12 rises and the side plate 16 is pushed in the direction indicated by an arrow A2.

Consequently, as the male screw 19 is also pushed in the same direction, a load is applied also to the female screw 20 that is threadedly mated with the male screw 19, and hence, shared loads W1–W10 are applied to the respective screw threads FS1–FS10.

However, if these sharing loads are too heavy, the female screw threads would be subjected to elastic deformation and plastic deformation, resulting in change of the pitch of the female screw, thus the load really borne by each screw thread FS is only the force component corresponding to the elastic deformation, and the exceeding load is borne by the next screw thread.

In addition, for the transmission loads to be shared, the respective screw threads would bear the loads in accordance with the magnitudes of the contact areas, and the exceeding loads are borne by the next succeeding screw threads.

In this way, the real sharing load of each screw thread is determined by the contact area of the female screw thread; accordingly if the contact heights FW of the female screw threads are successively lowered along the direction of the applied tensile load, that is, along the direction indicated by an arrow A1, then the above mentioned contact areas are also successively reduced along the same direction, and so, the shearing loads borne by the respective screw threads would become nearly equal to one another.

Furthermore, since the contact heights are successively lowered along the direction indicated by an arrow A1 as described above, the lengths of span which influence the magnitudes of the bending moments are also successively reduced along the same direction.

Accordingly, the peak bending moment per unit length arising at the bottom of valley of the screw in the tip end portion 20E of the female screw, that is, the largest one of the bending moments per unit length applied to the bottoms of valley f1–f10 of the respective female screw threads is also reduced, and therefore, the maximum bending moments per unit length at the bottoms of valley f1–f10 of the respective female screw threads are equalized.

As a result, the amplitude of the bending moment applied to the bottom of valley of each screw thread also becomes small, and hence, an internal-pressure-bearing female screw having excellent fatigue characteristics can be provided.

Figure 3:
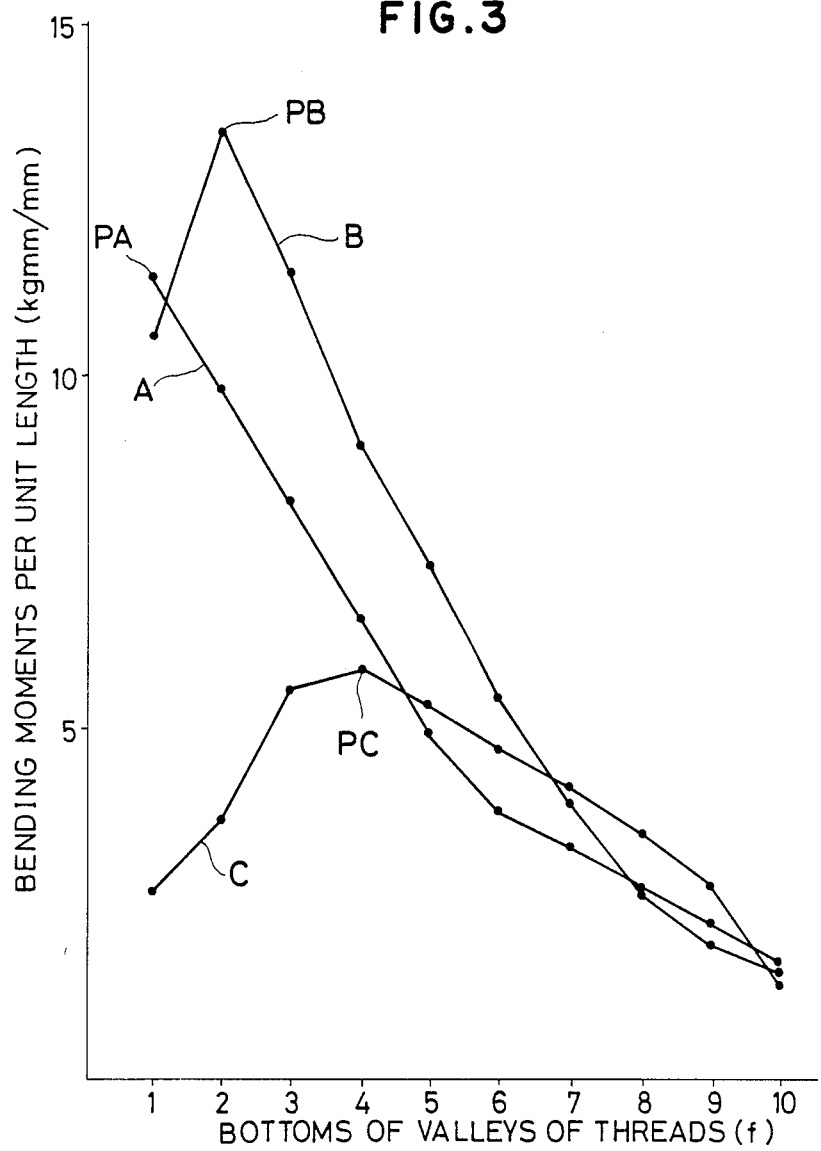
FIG. 3 is a diagram showing a relation between the respective bottoms of valleys of female screw threads and the maximum bending moments per unit length.

In this connection, an accumulator employing the female screw according to the present invention was manufactured and an experiment similar to that conducted for the above-described accumulator in the prior art was conducted. Then, the maximum bending moments per unit length applied to the bottoms of valleys of the respective female screw threads were as shown by curve C in FIG. 3, in which the peak bending moment per unit length PC=5.8 kg·mm/mm is less than one-half of the peak bending moment per unit length PA of the accumulator A in the prior art, and the fatigue life was proved to be 2,000,000 times that is four times or more as large as the fatigue life of the accumultor in the prior art.

It is a matter of course that this invention is not limited to triangular screw threads, but it can be utilized in square threads, round threads, trapezoidal screw threads etc.

Figure 4:
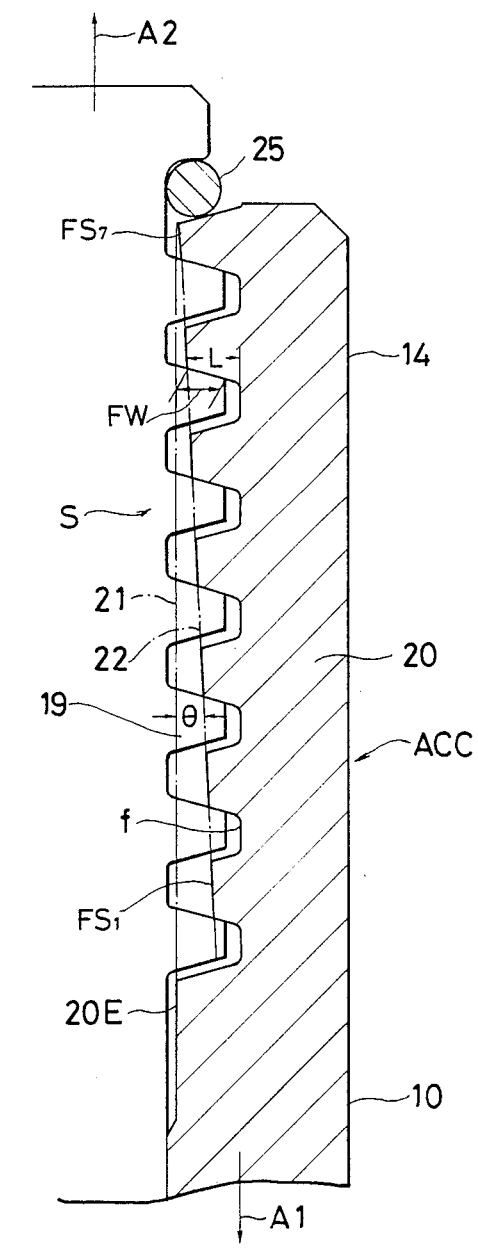
FIGS. 4 and 5 are enlarged longitudinal cross-section views corresponding to FIG. 1, respectively, showing other preferred embodiments of the invention.

In addition, it is a matter of course that as shown in FIG. 4, contact heights FW of a female screw 20 could be successively reduced along the direction of the applied load, that is, in the direction indicated by an arrow A1 by successively lowering the heights of the threads over the entire length of a trapezoidal screw, that is, from a female screw thread FS7 to a female screw thread FS1.

Figure 5:
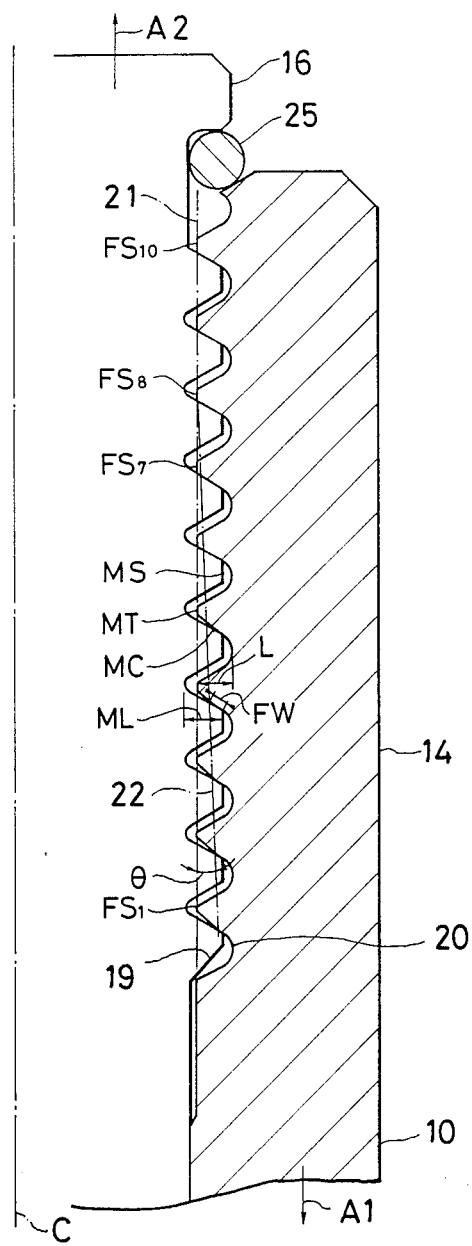
Figure 6:
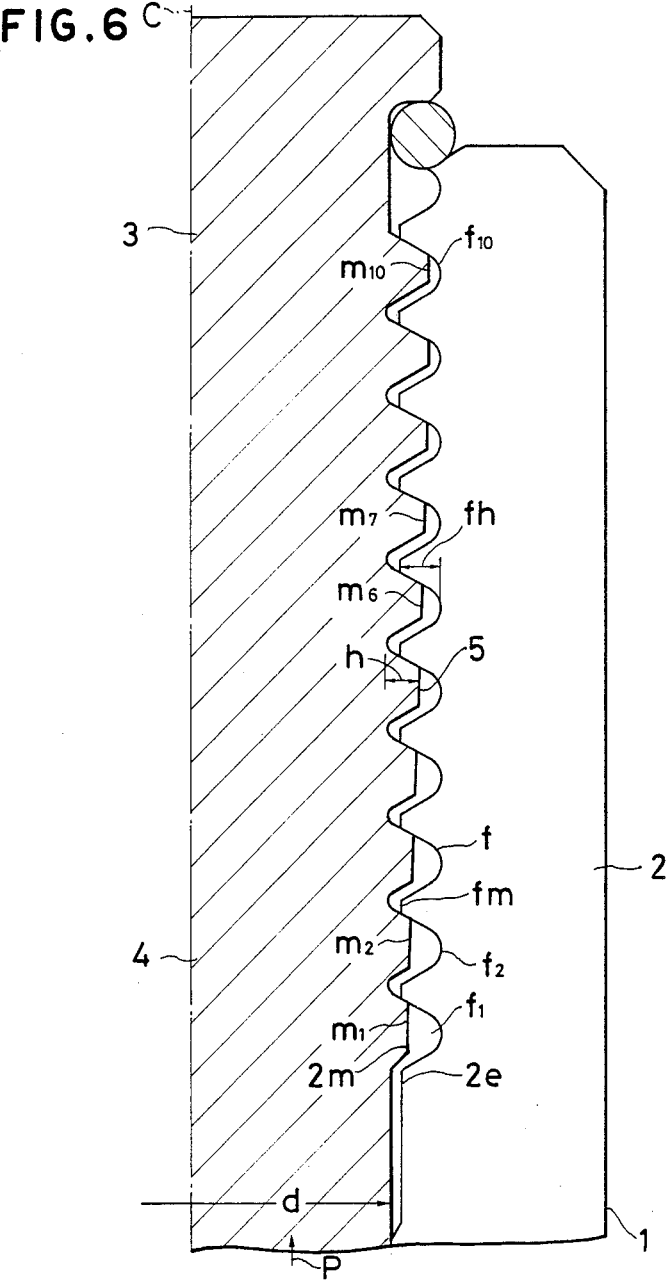
FIG. 6 is an enlarged longitudinal cross-section view showing one example in the prior art.

Furthermore, as shown in FIG. 5, the contact heights FW of a female screw could be successively reduced along the direction indicated by an arrow A1 by equalizing the heights L of the respective female screw threads and gradually decreasing contact surfaces MC at the crest portions MT of the female screw threads FS7–FS1.

According to the present invention, since the thread contact heights of a female screw are successively lowered along the direction of the applied tensile load, the sharing loads of the respective female screw threads are equalized, and the maximum bending moments per unit length at the bottoms of valleys of the respective screw threads are also equalized.

Accordingly, as the peak bending moment per unit length appearing at the end portion of a female screw and the bending moment amplitude are reduced, a fatigue life is elongated.

Consequently, an internal pressure-bearing female screw having excellent fatigue characteristics can be provided, and also, the wall thickness and the length of the screw can be made thin and short as compared to the female screws in the prior art.

Accordingly, a space for a female screw can be made small, and hence, if this female screw is utilized in a hydraulic implement such as an accumulator, a hydraulic cylinder, etc., reduction of a size of an apparatus can be achieved.

What is claimed is:

1. An internal-pressure-bearing female screw formed on the inside of an opening of a vessel main body where an internal pressure varies and formed to be mated with a male screw to form a screw connection adapted to be applied with a varying composite load due to variation of an internal pressure, said male and female screws having threads, said threads having valleys and heights, characterized in that the thread contact heights of said female screw are formed so as to be successively lowered along the direction of the center of the vessel main body, the distance from female thread valley bottom to female thread valley bottom being substantially constant, and a line connecting said female thread valley bottoms being substantially parallel with a line connecting male thread valley bottoms.

2. An internal-pressure-bearing female screw as claimed in claim 1, characterized in that the thread contact heights of said female screw are formed so as to be successively lowered along the direction of the center of the vessel main body by cutting and shaping the crests of the threads.

3. An internal-pressure-bearing female screw as claimed in claim 1, characterized in that the thread contact heights of said female screw are formed so as to be successively lowered along the direction of the center of the vessel main body by cutting away the contact surfaces of the crest portions of the female screw.

4. An internal-pressure-bearing female screw as claimed in claim 1, characterized in that the crests of the respective threads of said female screw are positioned along the same tapered straight line.

5. An internal-pressure-bearing female screw as claimed in claim 4, characterized in that the taper angle of said tapered straight line is 10 degrees or less.

* * * * *